(No Model.)
L. H. NASH.
COMBINED GAS PRODUCER AND GAS ENGINE.
No. 322,063. Patented July 14, 1885.
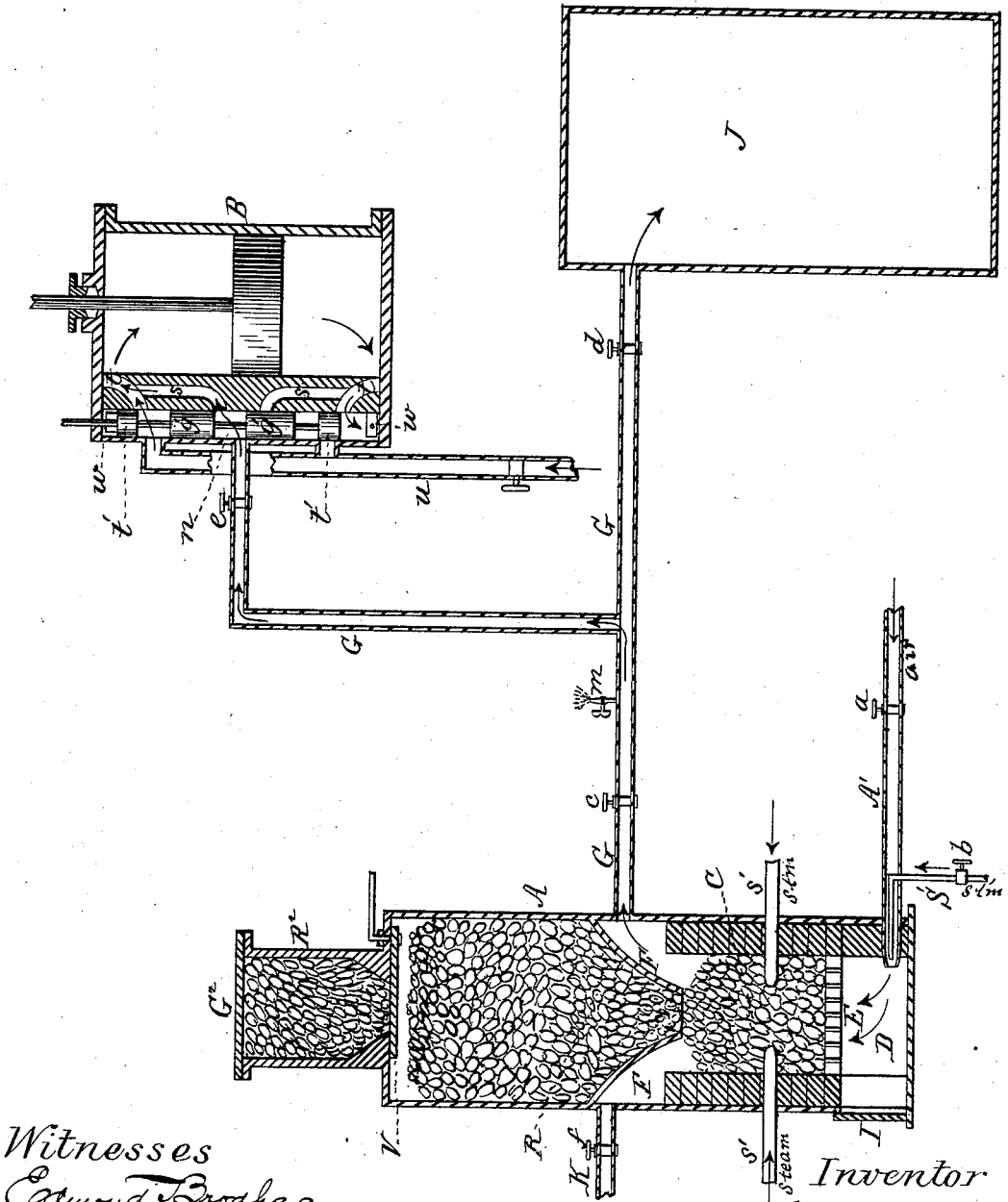
Witnesses
Edmound Brodhag
W E Chaffee
Inventor
pro Lewis H. Nash
Johnson and Johnson
Attys

UNITED STATES PATENT OFFICE.

LEWIS HALLOCK NASH, OF BROOKLYN, ASSIGNOR TO THE NATIONAL METER COMPANY, OF NEW YORK, N. Y.

COMBINED GAS-PRODUCER AND GAS-ENGINE.

SPECIFICATION forming part of Letters Patent No. 322,063, dated July 14, 1885.

Application filed December 5, 1882. (No model.)

*To all whom it may concern:*

Be it known that I, LEWIS HALLOCK NASH, a citizen of the United States, residing at Brooklyn, in the county of Kings and State of New York, have invented new and useful Improvements in Combined Gas Producer or Converters and Gas-Engine, of which the following is a specification.

The invention herein is directed to the production of a gas generator or converter adapted to produce and supply gas to the engine from coal or other solid fuel as an attachment for such engine. In my said application gas may be produced from highly-volatile oils—such as naphtha—without preparation by steam, and without mixing air with the gas directly within the generator or converter. The production of gas from solid fuel for operating a gas-engine requires the presence of both steam and air within the generator or converter to effect the combustion, and the production of gas may burn within the working-cylinder without producing a deposit therein.

The provision of a gas-producing attachment for operating a gas-engine and of producing the gas from liquid or from solid fuel is important to meet a contingency when one or other kind of fuel is not obtainable, or when from any cause it is desirable to use one or the other fuel from which to produce the gas where there is no gas-supply available. In such gas producer or converter using solid fuel, the oxygen of the steam uniting with the carbon of the fuel forms carbonic acid or carbonic oxide and hydrogen gas. In effecting this chemical union, the steam and air are introduced into an air-tight combustion-chamber in regulated quantities, and the gas is produced within said chamber under sufficient pressure to overcome whatever pressure is being maintained within the power-cylinder of the engine.

The production and preparation of the gas under pressure in the generator or converter avoids the use of a gas-compressing pump, and the danger of an explosion from a reservoir into which both the air and the gas are compressed, mixed, and stored to supply the mixed charge to the cylinder. Such a generator or converter provides an unlimited supply of gas, the flow of which can be regulated and its proper preparation be determined and effected as it is being produced. In such capacity the converter forms the generator for supplying the engine.

In combination with the gas producer or converter and gas-engine I prefer to use a reservoir, within which gas may be stored for use when the producer or converter is not in operation, whereby the engine may be run for a time independent of the converter. The gas-supply reservoir is also important when the engine itself is required to furnish the compressed air to be used in the gas producer or converter and in the working-cylinder, although such air-supply may be by an independent compressor.

Provision is made for supplying the magazine with coal while the generator is closed and in operation by means of gas-seal supply-chamber communicating with the magazine.

The accompanying drawing represents a gas producer or converter adapted for solid fuel combined with the valve system of a gas-engine and with a storing-reservoir for the surplus gas.

The gas-conducting pipe G is shown as connecting the air-tight chamber F of the gas generator or converter A with the valve-space $n$ of the engine B, from whence, at the proper time, the gas is admitted to the ports $s\,s$, and thence into passages $t\,t$, for supplying the charge of compressed air from the pipe $u$, leading to the air-compressor. The exhaust-ports for the waste gases from the engine are shown at $w$. A valve of four sections is shown, in which two, $g'\,g'$, control the admission of the gas, and two, $t'\,t'$, control the admission of the air; but separate operating-valves may be employed for this purpose.

The gas producer or converter consists of an air-tight case, A, provided with a suitable combustion-chamber, C, lined with fire-brick, an ash-pit, D, below the grate E, and a magazine-feed, R, above the combustion-chamber, the gas from which collects in the chamber F under pressure of the air and steam introduced into the combustion-chamber. The magazine is closed at the top by an air-tight cover, $G^2$, and the ash-pit has an air-tight door, I, through which the ashes are withdrawn. The air and the steam supply pipes A' and S' are arranged to enter the ash-pit of the combustion-chamber, and the pipe G connects the gas-chamber F of the gas-generator with the engine-valves. Pipes s' s' may also be arranged to admit steam directly into the body of the burning coal above the grate, but not in sufficient quantity to materially retard the combustion or lower the temperature of the fuel below the point when the fuel will decompose the steam. The producer-case A may be inclosed by a non-conducting material to prevent the radiation of the heat. The pipe G, by which the prepared gas is conducted to the engine, may be provided with a burner, m, outside of the generator, by which to test the quality of the gas produced. As the gas is always under pressure in the producer, I provide the magazine with a gas seal or lock, $R^2$, preferably at the top, within which the coal is placed and held by a valve, V, by turning which the coal will be then dropped into the magazine from the gas seal or lock, which is closed against the escape of the gas while so supplying the magazine. The gas seal or lock is shown as a top extension of the magazine-chamber, and is contracted at its opening therein, at which point the valve V is arranged to close said communication and form the bottom of said top supply-chamber. The valve may be arranged to slide or to turn upon a pivot, as shown. The magazine being filled, it is supplied, as required, by filling the gas-seal, closing its top, and opening the valve, allowing the coal to drop into the magazine, and is again closed to be again filled, thereby maintaining the full pressure of the gas within the generator-chamber, and prevent its escape at the feed-opening. In this way the feed of the coal is made practically continuous within a gas-producing chamber in direct communication with the working-cylinder of a gas-engine, so that the operation of the latter need not be stopped in feeding the magazine. The ash-pit may be provided with a similar gas-seal to allow of the removal of the ashes without suspending the steam and air jets. I prefer, however, to have the ash-pit large enough to hold all the ashes made while the gas-producer is in operation. A storage-reservoir, J, for the gas connects with the pipe G, which conducts the gas to the engine, so that such conducting-pipe connection will be between the reservoir and the gas-generator. The inlet-pipe A' for the compressed air is provided with a cock, a, and the inlet-pipe S' for the steam is provided with a cock, b, while the pipe G is provided with three cocks, c d e—one, c, arranged near its connection with the gas-generator, one, d, near its connection with the storage-reservoir, and one, e, near its connection with the engine, the branch of the pipe G connecting therewith being arranged between the said cocks d and e. A fire having been started in the generator or converter, air is admitted by the cock a to maintain combustion, and as soon as the coal is hot enough steam is admitted through the cock b with the air in the ash-pit, and steam may also be admitted above the grate. The steam entering into combination with the coal, carbonic-acid, carbonic-oxide, and hydrogen gases are formed under pressure in the chamber F and pass out through the pipe G, the cocks c d being opened into the reservoir; and if the engine be in operation the gas will also be supplied thereto by opening cock e. The reservoir, being filled with gas in this way under pressure, may be closed by the cock d, and the gas so stored may be used to run the engine for a time if, for any reason, the generator or converter is not in use. Where the engine forms the motor for supplying the compressed air to operate it, this storage-reservoir is an important matter to run the engine while starting the gas-generator. In such event the cock c is closed and the products of combustion escape through the pipe K, the cock f whereof being opened, while the cocks d and e are also opened to allow the gas to pass under pressure from the storage-reservoir into the working-cylinder. Compressed air being admitted into the generator, as soon as the combustion of the coal is sufficiently advanced, steam is also admitted, and the generation of gas commences. Now, closing cock f and opening cock c, gas is supplied, under pressure, from the generator-chamber direct to the engine, the cock d being still open, so that the reservoir, being again fully charged by the gas from the generator, may co-operate with the generator to render the supply to the engine of uniform quality, quantity, and pressure. In this construction the compressed air admitted to the generator, while primarily promoting combustion, co-operates with the steam to force the gas from the generator into the working-cylinder under sufficient compression.

While I have shown the gas-storage chamber as being combined with a generator adapted to produce gas from solid fuel, it is obvious that such storage-reservoir may be so combined with a generator adapted to produce gas from hydrocarbon oils, and such reservoir is of special advantage in providing for supplying the working-cylinder when from any cause the gas-generator may be stopped for a while.

In the pipe connecting the gas-chamber of the generator with the engine a chamber may be placed, into and through which the gas passes for collecting the tar, water, or liquid matter that may be formed with the gas in the same manner as used in gas-mains for illuminating purposes.

I claim—

1. The combination, with the valves of a gas-engine, of a gas-generator having a combustion-chamber and pipes for supplying air and steam thereto under pressure, the reservoir J, the pipe G, and the cocks a b c d e, whereby the engine may be supplied from the generator or from the reservoir with gas under sufficient pressure to overcome the pressure in the working-cylinder, substantially as herein set forth.

2. The gas-generator for supplying a gas-engine, and herein described, having the pipes G, S', A', and K, provided with cocks $a\ b\ c\ d\ e\ f$, in combination with the reservoir J, into which said pipe G terminates and has communication with the inlet-valves of the engine, substantially as herein set forth.

In testimony whereof I have hereunto set my hand in the presence of two subscribing witnesses.

LEWIS HALLOCK NASH.

Witnesses:
CHRISTOPHER C. WHITTEMORE,
WILLIAM C. WESTERVELT.